United States Patent [19]
George et al.

[11] Patent Number: 5,195,843
[45] Date of Patent: Mar. 23, 1993

[54] CERAMIC FOAM BODY HAVING CLOSED CELL STRUCTURE

[75] Inventors: Billy L. George, Hudson, Wis.; Timothy J. Gennrich, Lake Elmo; Joseph Graham, Plymouth, both of Minn.

[73] Assignee: Minnesota Mining and Manufacturing Company, St. Paul, Minn.

[21] Appl. No.: 707,836

[22] Filed: May 30, 1991

[51] Int. Cl.⁵ .................... E02B 15/06; C04B 20/04
[52] U.S. Cl. ........................ 405/63; 264/43; 405/72
[58] Field of Search .................... 405/63–72; 210/242.1, 923, 924; 264/22, 25, 41, 42, 43

[56] References Cited

U.S. PATENT DOCUMENTS

| | | | |
|---|---|---|---|
| 3,341,339 | 9/1967 | Stein | 264/43 X |
| 3,441,396 | 4/1969 | D'Eustachio et al. | 264/43 X |
| 3,689,611 | 9/1972 | Hardy et al. | 264/43 |
| 4,071,369 | 1/1978 | Kurz et al. | 264/43 X |
| 4,507,017 | 3/1985 | Magoon | 405/66 |
| 4,537,528 | 8/1985 | Simpson | 405/72 |
| 4,605,586 | 8/1986 | Lane | 405/63 X |
| 4,923,332 | 5/1990 | Sanocki et al. | 405/63 |

Primary Examiner—David H. Corbin
Attorney, Agent, or Firm—Gary L. Griswold; Walter N. Kirn; Gregory D. Allen

[57] ABSTRACT

A cylindrical ceramic foam body that can be the sole buoyant member of an oil-containment boom is produced by firing a mixture of fine particles of ceramic precursor, a source of carbon such as silicon carbide, and a metallic oxide. In the boom, a stack of the ceramic foam bodies, each of which is a cylinder, can be held together by wire mesh to provide a buoyant log. A plurality of the buoyant logs can be inserted end-to-end into a 3-layer loop, viz., an inner layer of a ceramic textile fabric, a middle layer of knitted wire mesh, and an outer layer of polymer-coated fabric.

19 Claims, 1 Drawing Sheet

CERAMIC FOAM BODY HAVING CLOSED CELL STRUCTURE

BACKGROUND OF THE INVENTION

1. Field of the Invention

The invention concerns a ceramic foam body that can be used as a buoyant member of a boom for containing an offshore oil spill, either while the oil is burned off or until the oil can be taken away for disposal. Among other uses, the novel ceramic body can be a fire-resistant building material.

2. Description of the Related Art

An effective technique for the disposal of offshore spilled oil is to burn it off while it is confined within a floating fire-resistant boom. This technique can dispose of oil layers as thin as 1 to 2 mm but is more effective for thicker layers which can be burned with efficiencies in excess of 95%.

A fire-resistant boom of U.S. Pat. No 4,537,528 (Simpson) includes a flotation member such as plastic foam or cork surrounded by at least two layers of heat-resistant, water-sorbent material such as woven glass fibers that extend into the water in the form of a dependent skirt. The bottom of the skirt is formed with a loop for receiving a tensioning chain. Water drawn up by the skirt is said to keep inner layers of the boom free from fire damage. Unfortunately, booms that depend upon wicking can lose as much as fifty percent of their buoyancy during use. It is understood that a bottom-tensioned, cylindrical-flotation, fire-containment boom has been manufactured by Fire Control Inc. utilizing teachings of the Simpson patent.

A fire-resistant boom of U.S. Pat. No. 4,923,332 (Sanocki et. al.) has a flotation core (15) consisting of a closed-cell foam log (18) wrapped in a knitted wire mesh (19) and a heat conducting metal foil (20). The foam log can be a glass foam or borosilicate ceramic foam, the former being preferred because of cost and availability. The flotation core is surrounded by a heat insulating spacer (14). The spacer can be a wire mesh that has been knitted to form a plurality of pockets, each of which is filled with ceramic foam spheres that are impermeable to water and so contribute to the buoyancy of the boom. Covering the spacer are a tightly woven ceramic textile fabric (13), a knitted wire mesh (12), and a polymer-coated fabric (11) that is formed with a pocket (17) to receive a ballast chain. When used to contain burning oil, so much of the outer polymer-coated fabric that extends above the water line can burn away without the boom coming apart, because the three outer layers are fastened together below the water line, and the woven ceramic textile fabric (13) continues to hold the assembly together.

The Sanocki boom is currently marketed by 3M Co. as "3M Fire Boom" in 50-foot (15.2-m) lengths with seven sections, each section containing two end-to-end glass foam logs, each 91.5 cm in length. The boom has adequate flexibility between sections to permit it to be arranged in a zig-zag pattern of straight, side-by-side sections. When so laid out on a deck of a ship, the boom can be payed out to be deployed around an oil spill. The section lengths are chosen for convenience in shipment to permit the boom to be transported on a highway with the sections extending between the sides of the truck.

Although the Sanocki boom is highly effective, it is inherently expensive, and the voids in its spacer can become filled with water, thus reducing its buoyancy. When its foam log is glass to reduce the cost, the glass foam can be damaged by heat encountered during oil burnoff, thus reducing its buoyancy to the point that the boom might sink. Furthermore, the ceramic foam spheres of the outer buoyancy member are not very strong and might be crushed when the boom is forced against hard objects while being towed.

SUMMARY OF THE INVENTION

The invention concerns a ceramic foam body that can be the sole buoyant member of an oil-containment boom, in contrast to the complexity of the flotation members of the Sanocki boom. The less complex construction permitted by the use of the novel ceramic foam body enables the oil-containment boom of the invention to be both more economical and more buoyant than the Sanocki boom. In spite of its less complex construction, the novel boom should be as effective as the Sanocki boom for containing burning oil and at least as resistant to damage, both from impact forces and from the heat of a burning oil spill. Other uses for the novel ceramic foam body are disclosed below.

Briefly, the ceramic foam body of the invention is the product of firing a mixture of fine particles of, by weight,

- 100 parts of ceramic precursor,
- a source of carbon in an amount providing from 0.3 to 5 parts of carbon, and
- a nonrefractory metallic oxide in an amount providing from 0.3 to 3 parts of oxygen at a temperature sufficient to produce a ceramic foam body having a hard-shell crust, a closed-cell interior, and a density of from 0.1 to 0.5 g/cm$^2$. The average cell size of the interior should be from 1 to 25 mm, preferably from 5 to 10 mm.

The fine particles of the mixture of ceramic precursor, source of carbon, and nonrefractory metallic oxide preferably are of substantially uniform size up to about 15 $\mu$m. The use of larger particles would tend to result in undesirably high densities. Although lower densities could be attained by using smaller particles, the grinding necessary to achieve average particle sizes below about 2 $\mu$m would tend to make the use of such particles uneconomical. Hence, the choice of particle size balances cost versus degree of buoyancy. Because of their reasonable cost, particles having a mean size of from 5 to 10 $\mu$m are generally preferred.

A preferred ceramic precursor is noncrystalline volcanic ash such as rhyolite or pumice. Typically, volcanic ash contains nonrefractory metal oxides so that there may be no need to add a metal oxide separately. Also useful are vermiculite, perlite, obsidian, feldspar, and discarded bottle glass, some of which are not readily available in desirably small particle sizes and so may not be economical to use because of the added cost of grinding.

A preferred nonrefractory metallic oxide is iron oxide because it is inexpensive and reacts with carbon to release gases within the preferred range of firing temperatures. Also useful are nonrefractory oxides of zinc, cobalt, tin, nickel, copper, and manganese. Preferably, the metallic oxide is employed in an amount providing from 1 to 2 parts oxygen per 100 parts by weight of the ceramic precursor. At substantially above 2 parts, the average cell size of the novel ceramic foam body tends to be undesirably large, thus resulting in possibly inferior strength and durability. At substantially below 1 part, the cells may not have desirably good uniformity in size. Instead of metallic oxide, it should be possible to employ any compound that reacts with carbon to form gases that expand the softened ceramic precursor to produce a ceramic foam body.

Useful sources of carbon include silicon carbide and carbon black. Petroleum would be equally useful except for its obnoxious odor. Preferably, the carbon source is employed in an amount providing from 1 to 3 parts carbon per 100 parts by weight of the ceramic precursor. At substantially above 3 parts, the average cell size of the novel ceramic foam body tends to be undesirably large, thus resulting in possibly inferior strength and durability. At substantially below 1 part, the cells may not have desirably good uniformity in size.

The addition of water to the mixture of fine particles of ceramic precursor, source of carbon, and metallic oxide makes it moldable. For easier handling and better green strength, a clay such as bentonite and/or an organic binder such as poly(vinyl alcohol) can be added. A green shape can be fired either while freestanding or while supported by a sagger, or a loose mixture of the fine particles can simply be poured into a sagger. Whether or not a sagger is used, the firing results in a ceramic foam body having a closed-cell structure with a tough, dense crust. When using a sagger, its cavity preferably is slightly tapered and is coated with a parting agent for ease of removing the ceramic foam body.

The mixture of fine particles can be fired at any temperature at which the metallic oxide reacts with carbon and the ceramic precursor softens. Typical firing temperatures are from 1000° to 1200° C., preferably from 1050° to 1130° C. At firing temperatures substantially higher than that preferred range, the ceramic foam body might develop undesirably large average cell size and hence have poor tensile and compressive strengths. At firing temperatures substantially below that preferred range, the ceramic foam body might be undesirably dense.

When the ceramic foam body is to be used in an oil-containment boom, it preferably is a cylinder of substantially circular cross direction and from 20 to 25 cm in height. At substantially greater heights, the weight of the foam body might cause it to become undesirably dense unless the green shape is fired on its side. Substantially shorter heights would be less economical to produce. To produce a cylindrical ceramic foam body of from 20 to 25 cm in height, a soak of two hours at the preferred range of firing temperatures is generally sufficient to ensure substantially uniform cell formation. A longer soak may be desirable in large-scale production to ensure complete penetration of heat into every ceramic foam body that is being produced.

A soak of less than two hours should be sufficient when the firing temperature is close to 1200° C. or when the mixture of particles has been gradually heated to the preferred range of firing temperatures. However, an overly long exposure to a firing temperature close to 1200° C. might cause the cell structure to begin to collapse, and this might happen when even higher temperatures are maintained for shorter periods of time.

Following the firing, the ceramic foam body should be cooled slowly to avoid thermal shock, e.g., from 1° to 15° C./min., preferably not faster than 10° C./min.

In addition to being useful in a fire-containment boom, the novel ceramic foam body should have other flotation uses, e.g., as the flotation member of a buoy. As compared to flotation materials now in commercial use, the novel ceramic foam body should be more resistant to weathering. In fact, it should be virtually immune to degradation upon exposure to adverse environmental conditions.

Because the novel ceramic foam body is lightweight, tough, impervious to water, highly resistant to weathering, and provides excellent thermal insulation, it should have other commercial uses, e.g., as a substitute for conventional ceramic roofing tile. When viewed from a distance, the hard-shell crust of the novel ceramic foam body can make it almost indistinguishable from conventional ceramic roofing tile. As compared to conventional ceramic roofing tile, tile of the novel ceramic foam body has much greater impact resistance and can even be nailed, thus making it more economical to apply By being much lighter in weight, tiles of the novel ceramic foam body allow the supporting structure to be of more economical construction, and lighter tiles are much less likely to fall through the roof in the event of a fire.

Because of the aforementioned properties, the novel ceramic body should be useful as a building material wherever fire resistance is required, e.g., as the core of a fire door or the facing of a fire wall or as a subdecking for a roof that is flammable. Another use is as a floating cover for an oil tank, both for protection against fire and to inhibit volatilization. In such uses, the density of the novel ceramic body preferably is somewhat greater than in flotation uses in order to afford good strength, while being low enough to afford the advantages of reduced weight and improved thermal insulation. For most applications as a building material, the density of the novel ceramic body preferably is from 0.2 to 0.5 $g/cm^3$, as compared to a preferred density of from 0.1 to 0.2 $g/cm^3$ for flotation uses, although very low densities may be desirable in some uses as building material, e.g., landscape rocks.

DESCRIPTION OF THE PREFERRED EMBODIMENTS

Figure 1:
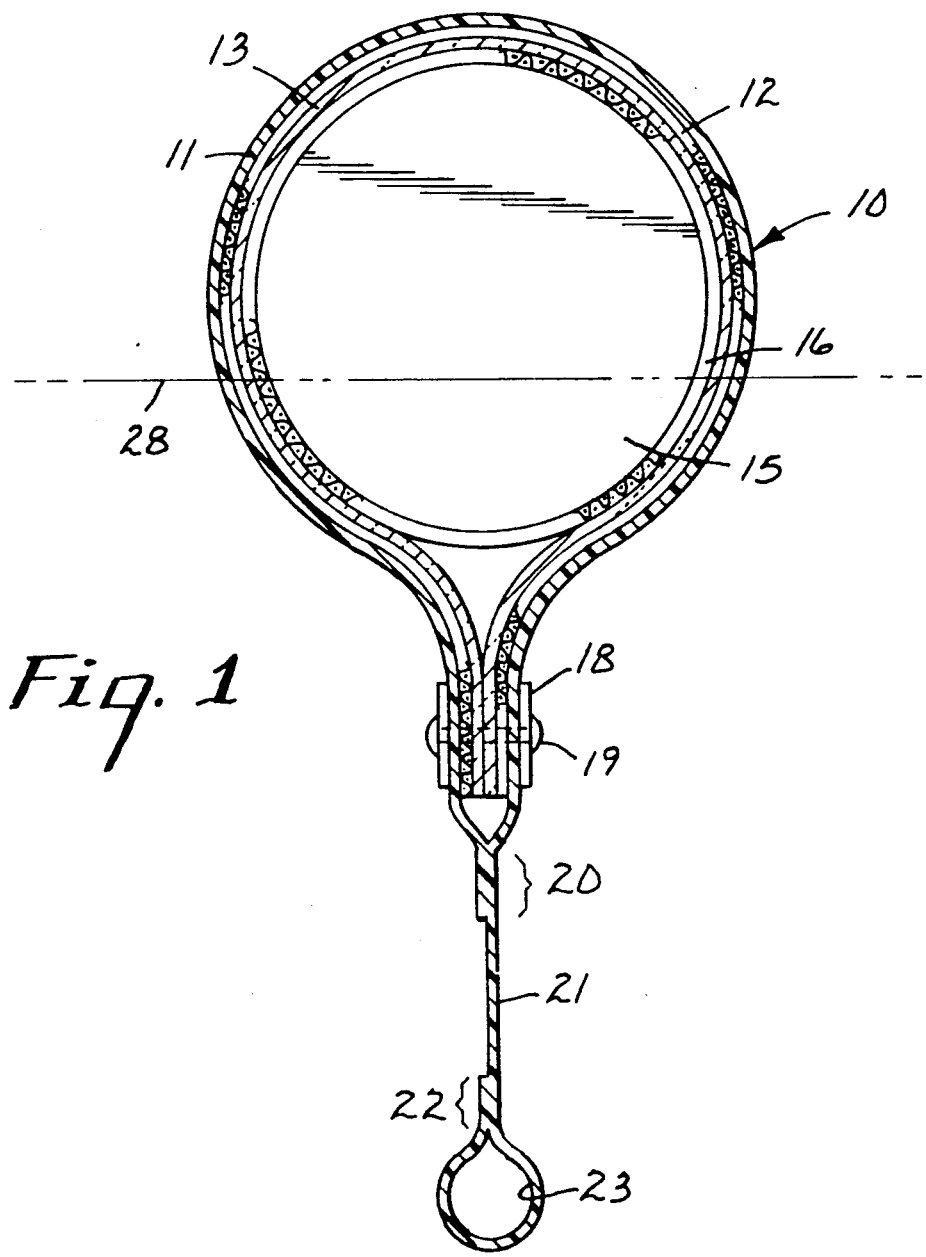
FIG. 1 is a schematic transverse cross section through an oil-containment boom that incorporates a stack of ceramic foam bodies of the invention.
Figure 2:
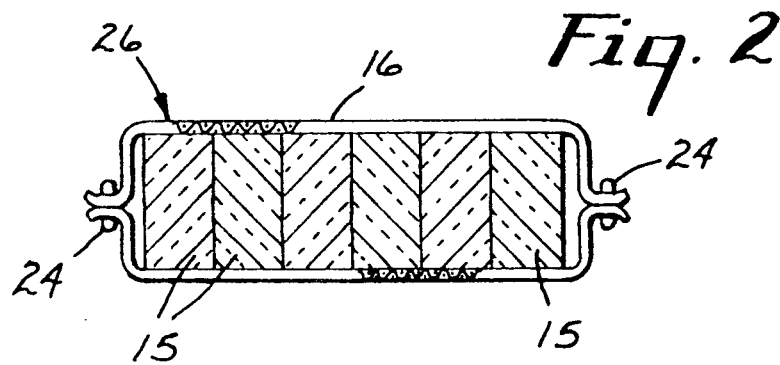
FIG. 2 is a schematic longitudinal cross section of reduced scale through a buoyant log that is employed in the oil-containment boom of FIG. 1.

An oil-containment boom 10 as shown in FIG. 1 has an outer layer 11 of polymer-coated fabric, a first underlayer 12 of knitted wire mesh, and a second underlayer 13 of tightly woven, high-temperature-resistant refractory fabric such as a ceramic textile fabric. The layers 11, 12 and 13 are wrapped around stacks of cylindrical ceramic foam bodies 15, and each stack is encompassed by a wire mesh sleeve 16 to provide a buoyant log 26 as seen in FIG. 2. The boom is unified by a stainless steel seaming bar 18 and rivets 19. The ends of the outer layer 11 of polymer-coated fabric extend beyond the seaming bar and are heat-sealed together at 20. One of those ends 21 extends beyond the other to provide a skirt and is heat-sealed to itself at 22 to form a pocket 23 for a ballast chain (not shown).

To assemble a plurality of the cylindrical ceramic foam bodies 15 as shown in FIG. 2, they are stacked and held together by the wire mesh sleeve 16, the ends of which are bunched and fastened with stainless steel hog rings 24 to provide a buoyant log 26. A plurality of the buoyant logs are inserted end-to-end into the loop formed by the three layers 11, 12, and 13, and the ends of that loop are folded over and fastened with a vertical stainless steel connector plate (not shown) to provide the oil-containment boom 10.

For reasons stated above in connection with the Sanocki boom, each of the buoyant logs 26 preferably is about 2 m in length and is spaced from adjacent logs sufficiently to permit the boom to be laid in a zig-zag pattern of straight, side-by-side sections, and there may be about seven sections in the boom.

The diameter of the ceramic foam body is selected according to the roughness of the seas in which the boom is to be deployed. Its diameter should be at least 10 cm for use in calm waters and up to 100 cm for use in rough seas. The relatively short individual ceramic foam bodies allow the boom to track the surface of the water, in contrast to the tendency of long rigid flotation members to be tossed by wave action, thus possibly allowing oil to escape from the boom. Hence, the freeboard of the novel boom may not need to be as high as that of prior booms to be useful in equally rough seas. On the other hand, a long ceramic foam body may be more economical for use in calm waters.

The polymer-coated fabric outer layer 11 is preferably nylon fabric coated with polyvinylchloride. Other fabrics and polymer coatings may be used such as polyester fabrics and polyurethane coatings. The outer layer 11, during fire containment, can burn to the water line 28 causing the underlayers 12 and 13 to be exposed to the burning oil, but without disrupting the utility of the boom.

Each of the first underlayer 12 and the wire mesh sleeve 16 preferably is a knitted wire mesh of stainless steel, inconel, steel, galvanized steel or other alloys. A preferred knitted wire mesh is made of 310 stainless steel (available from Metex Corporation) having a wire diameter of about 250 $\mu$m with knitted opening sizes corresponding to a density number of 60. The density number relates to the spacing of the needles on the knitting machine and is well known in the industry.

The second underlayer 13 preferably is a refractory fabric that is resistant to higher temperatures, e.g., 0.64 mm thick open mesh, tight weave (3×3 picks/cm) ceramic/metal hybrid (85% ceramic/15% refractory metal wire) fabric woven from 2000 denier, ⅛ served continuous polycrystalline ceramic fiber yarn and 304 stainless steel wire. The ceramic yarn preferably comprises, by weight, 70% aluminum oxide, 2% boron oxide and 28% silicon dioxide (commercially available as NEXTEL ™ 440 fibers). The ceramic/metal fabric of the underlayer 13 preferably has a basis weight of from 0.3 to 0.5 kg/m². Other fabrics which can be used as the underlayer 13 include fabrics of NEXTEL ™ 312 ceramic yarn comprising, by weight, 62% aluminum oxide, 24% silicon dioxide and 14% boron oxide (3M), ASTROQUARTZ ceramic fibers (J. P. Stevens), and leached fiberglass filaments (Hitco or Haveg) or hybrid combinations thereof with or without metal wire.

In the following examples, all parts are by weight.

EXAMPLES 1-12

A series of cylindrical ceramic foam bodies were made starting with mixtures of

|  | parts |
|---|---|
| volcanic ash, ave. particle size about 8 $\mu$m | 100 |
| silicon carbide, ave. particle size about 5 $\mu$m | 3 |
| additional nonrefractory metal oxide (amounts indicated below in TABLE I) | — |
| water | 17 |

| The volcanic ash was a cretaceous volcanic ash having a specific gravity of 2.42 and the composition: | |
|---|---|
| $SiO_2$ | 68.9% |
| $Al_2O_3$ | 15.1% |
| $Fe_2O_3$ | 2.6% |
| MgO | 1.4% |
| $SO_3$ | 0.1% |
| L.O.I. | 4.7% |
| Moisture | 1.1% |
| Available alkalies | 0.3% |

Each of the mixtures was formed by first mixing the dry powders in a Wring-type blender to assure a uniform dispersion. Water was then added to make each mixture slightly compactable. Preforms were prepared by placing 60 g of each mixture into a cylindrical die 2.25 inch (5.7 mm) in diameter and pressing at 10,000 psi (69 MPa). The preforms were placed in a high temperature furnace which was heated at 10° C./min. to a temperature of 1125° C., allowed to soak at that temperature for 2 hours, and then cooled at 10° C./min to room temperature. The fired shaped expanded to about 7–10 times their original volume to provide cylindrical ceramic foam bodies having the properties reported in Table I.

TABLE I

| Ex. | Non-refractory Metal Oxide | Parts | Density (lb/ft³) | (g/cm³) | Cell Size (mm) | Strength |
|---|---|---|---|---|---|---|
| 1 | none | — | 18.6 | .298 | 0.5–3 | v. strong |
| 2 | $Fe_2O_3$ | 1.5 | 14.3 | .229 | 0.5–5 | strong |
| 3 | $Fe_2O_3$ | 3 | 11.1 | .178 | 0.5–10 | strong |
| 4 | $Co_2O_3$ | 3 | 10.5 | .168 | 1–10 | weak |
| 5 | CuO | 3 | 13.7 | .220 | 0.5–15 | weak |
| 6 | $Cu_2O_3$ | 3 | 14.1 | .226 | 0.5–10 | weak |
| 7 | $MnO_2$ | 3 | 12.0 | .192 | 1–8 | weak |
| 8 | NiO | 3 | 12.8 | .205 | 0.5–10 | weak |
| 9 | SnO | 3 | 9.6 | .154 | 0.5–15 | brittle |
| 10 | $SnO_2$ | 3 | 9.4 | .151 | 0.5–15 | brittle |
| 11 | ZnO | 3 | 11.1 | .178 | 1–30 | weak |
| 12 | ZrO | 3 | 19.3 | .309 | 0.5–3 | v. strong |

When a composition as in Example 11 was later fired to a temperature of 1060° C. (instead of 1125° C.), a ceramic foam body was obtained that was strong and had a uniform cell size.

EXAMPLE 13

Cylindrical foam bodies were made starting with a mixture of

|  | parts |
|---|---|
| volcanic ash of Example 1 | 100 |
| silicon carbide | 3 |
| ferric oxide | 3 |
| water | 17 |

The average particle size of the ash was 8 $\mu$m, silicon carbide 5 $\mu$m, and ferric oxide 2 $\mu$m. 1260 g of the loose powder mixture were placed in cylindrical cavities (20.3 cm in diameter) of a 2-part ceramic mold that had been coated with a parting agent. While the cavities were covered with a ceramic plate, the mold was placed in a brick kiln and heated at 3° C./min to a temperature of 1080° C., allowed to soak at that temperature for 15 hours, and then cooled at 5° C./min to room temperature. The fired shapes expanded to fill the cavities of the mold and provided cylindrical ceramic foam bodies 8 in. (20.3 cm) in diameter, about 9 in. (22.8 cm) in height, and having a density of (0.175 g/cm$^3$).

EXAMPLE 14

Lightweight ceramic roofing tiles were made starting with a mixture of

|  | parts |
| --- | --- |
| volcanic ash of Example 1 . | 100 |
| silicon carbide, ave. particle size about 5 μm | 3 |
| ferric oxide, ave. particle size about 2 μm | 3 |
| water | 17 |

The average particle size of the mixture was 8 μm.

The mixture was placed in a rectangular die cavity and subjected to 10,000 psi (69 MPa) at room temperature. The resulting preform was removed from the cavity and placed in a kiln which was heated at 10° C./min. to a temperature of 1100° C., allowed to soak at that temperature for one hour, and then cooled at a rate of 10° C./min. The fired shape expanded to about 4 times its original volume to provide a ceramic foam tile having a length of 20 cm, a width of 12.5 cm, and a thickness of 2.5 cm. Its density was 0.34 g/cm$^3$.

Testing of the ceramic foam tile indicated that it met requirements for use as ceramic roofing tile. Its compressive strength (ASTM C648) was 1500 psi (10.3 MPa) and its moisture absorbance (ASTM C1026) was 0.2%. A hand-saw was used to cut one of the tiles into two pieces, and the sawn edges were clean, with no cracks extending into the body of the tile. Nails were driven through the ceramic foam tiles without creating any visible cracks or otherwise disrupting the impermeability of the tile to water.

What is claimed is:

1. A ceramic foam body produced by firing a green shape of a mixture of fine particles of, by weight,
    100 parts of ceramic precursor selected from the group consisting of volcanic ash, vermiculite, perlite, obsidian, and feldspar,
    a source of carbon in an amount of providing from 0.3 to 5 parts of carbon, and
    a nonrefractory metallic oxide in an amount providing from 0.3 to 3 parts of oxygen at a temperature sufficient to produce a ceramic foam body having a hard-cell crust, a closed-cell interior, and a density of from 0.1 to 0.5 g/cm$^3$.

2. A ceramic foam body as defined in claim 1 and having a density of from 0.1 to 0.2 g/cm$^3$.

3. A ceramic foam body as defined in claim 1 and having an average cell size of from 1 to 25 mm.

4. A ceramic foam body as defined in claim 1 wherein said volcanic ash comprises cretaceous volcanic ash.

5. A ceramic foam body as defined in claim 1 wherein the source of carbon is selected from silicon carbide and carbon black.

6. A ceramic foam body as defined in claim 1 wherein the metallic oxide is selected from oxides of iron, zinc, cobalt, tin, nickel, copper, and manganese.

7. A ceramic foam body as defined in claim 1 and having a cylindrical shape of substantially circular cross section.

8. A ceramic foam body as defined in claim 7 wherein the cylindrical shape is from 25 to 30 cm in height and from 10 to 100 cm in diameter.

9. An oil-containment boom comprising an outerlayer of polymer-coated fabric, a first underlayer of wire mesh, and a second underlayer of high-temperature-resistant refractory fabric, which layers are secured together and wrapped around a plurality of end-to-end buoyant logs, each comprising a stack of ceramic foam bodies encompassed by a wire mesh sleeve, said ceramic foam bodies being the ceramic foam bodies of claim 1.

10. Method of making a ceramic foam body comprising the steps of
    (a) forming a green shape of a mixture comprising water and fine particles of, by weight,
        100 parts of ceramic precursor, selected from the group consisting of volcanic ash, vermiculite, perlie, obsidian, and feldspar,
        a source of carbon in am amount providing from 0.3 to 5 parts of carbon, and
        a metallic oxide in an amount providing from 0.3 to 3 parts of oxygen, and
    (b) firing the mixture at a temperature sufficient to produce a ceramic foam body having a density of from 0.1 to 0.5 g/cm$^3$, a hard-shell crust, and a closed-cell interior.

11. Method as defined in claim 10 wherein the source of carbon provides from 1 to 3 parts of carbon.

12. Method as defined in claim 10 wherein the amount of carbon provides from 1 to 3 part of carbon.

13. Method as defined in claim 10 wherein the mixture used in step (a) further comprises a material selected from clay and organic binder.

14. Method as defined in claim 10 wherein said particles are of substantially uniform size within a range of from 2 to 15 μm.

15. Method as defined in claim 14 wherein the size of substantially all of the particles is from 5 to 10 μm.

16. Method as defined in claim 10, in step (b) of which the mixture is confined in a swagger.

17. Method as defined in claim 10, in step (b) of which the firing temperature is from 1000° to 1200° C. for at least one hour.

18. Method as defined in claim 17, in step (b) of which the firing temperature if from 1050° to 1130° C. for at least one hour.

19. Method as defined in claim 10, step (b) of which is followed by cooling not faster than 10° C./min.

* * * * *

UNITED STATES PATENT AND TRADEMARK OFFICE
CERTIFICATE OF CORRECTION

PATENT NO. : 5,195,843
DATED : March 23, 1993
INVENTOR(S) : Billy L. George; Timothy J. Gennrich; and Joseph Graham It is certified that error appears in the above-identified patent and that said Letters Patent is hereby corrected as shown below:

Column 1, line 35, "et. al." should read --et al.--.

Column 4, line 15, after "apply" please add --.--.

Column 7, line 55, "hard-cell" should read --hard-shell--.

Column 8, line 29, "perlie" should read --perlite--.

Column 8, line 30, "am" should read --an--.

Column 8, line 41, "carbon provides from 1 to 3 part of carbon" should read --metallic oxide is from 1 to 3 parts--.

Column 8, line 51, "swagger" should read --sagger--.

Signed and Sealed this

First Day of March, 1994

BRUCE LEHMAN

*Attest:*

*Attesting Officer*    *Commissioner of Patents and Trademarks*